United States Patent
Loersch

[15] 3,681,866
[45] Aug. 8, 1972

[54] MOUNTS FOR SLIDE TRANSPARENCIES

[72] Inventor: Johannes Loersch, Krefelder Strabe 40, 4153 Huls, Germany

[22] Filed: Feb. 1, 1971

[21] Appl. No.: 111,271

[30] Foreign Application Priority Data

Jan. 30, 1970 Germany..........P 70 03 062.5

[52] U.S. Cl..................................................40/152
[51] Int. Cl..............................................G09f 1/12
[58] Field of Search................40/10, 152, 152.1, 158

[56] References Cited

UNITED STATES PATENTS

| | | | |
|---|---|---|---|
| 2,959,882 | 11/1960 | Krull | 40/152 |
| 3,235,990 | 2/1966 | Back | 40/152 |
| 3,242,605 | 3/1966 | Kleinshmidt | 40/152 |
| 3,284,939 | 11/1966 | Perrot | 40/152 |

Primary Examiner—Robert W. Michell
Assistant Examiner—Wenceslao J. Contreras
Attorney—Mason, Mason & Albright

[57] ABSTRACT

A photographic slide film transparency mounting which consists of two mount halves for receiving the film, the mount halves being connectable by a plurality of protrusions and indentations in each of the mount halves and each having a recessed portion surrounding the image opening for receiving the film strip, the mount half in which the film is first affixed having applied thereto two adhesive points, the adhesive being of a type which does not harden completely such as a copolymer acrylester known also as copolymers acrylate, such adhesive points being placed longitudinally relative to the film strip to provide a capacity for the film to expand under the influence of heat from a slide projector and avoid warping under such circumstances.

4 Claims, 4 Drawing Figures

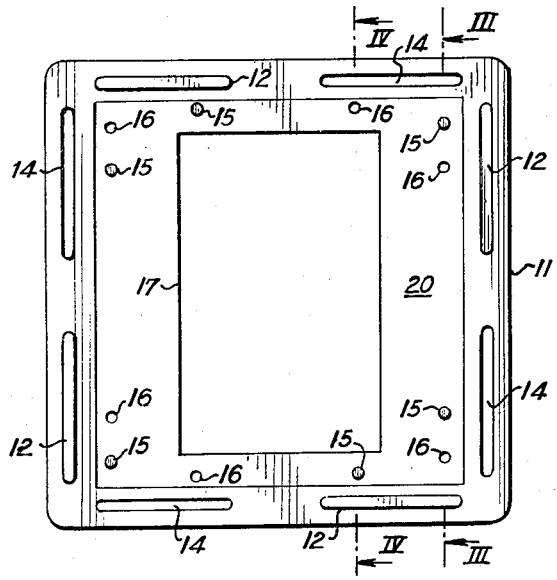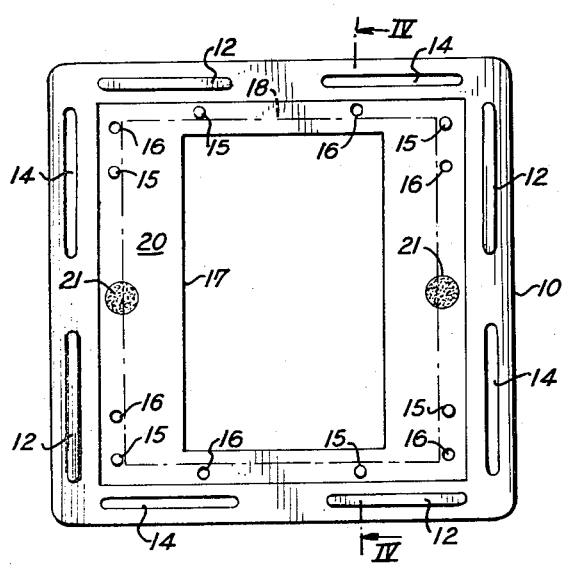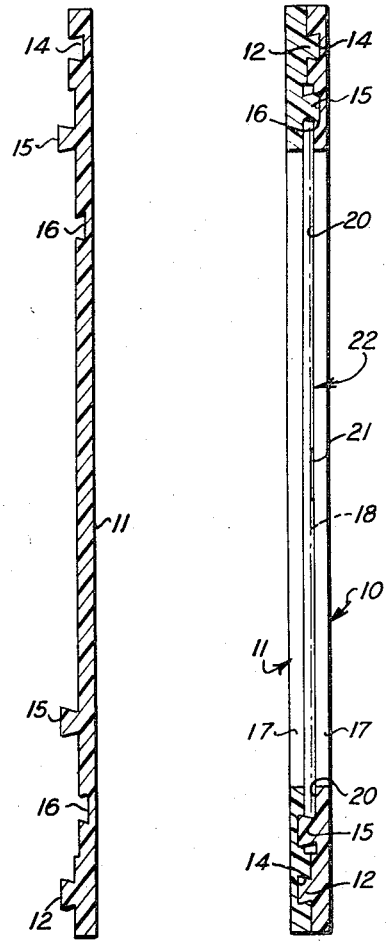

MOUNTS FOR SLIDE TRANSPARENCIES

SUMMARY AND BACKGROUND OF THE INVENTION

The invention relates to a mounting for photographic slide transparencies having two mounting halves which are adapted to be connected one on top of the other with the transparency received between the two mount halves.

It is known in the art to make provision in the portion of the mounting near the image window or opening of at least one of the mount halves for an adhesive point to which the transparency is affixed. Preferably the adhesive is of a self-sticking nature and sufficient space remains in the portion of the mounting for receiving the transparency for possible expansion of same under the influence of heat. However, a problem arises in that it is difficult to mount the films properly in such a manner by a conventional commercial apparatus for such purpose because the film material, due to its emulsion coatings on one side, has a slight warping running in the longitudinal or axial sense of the film strip which complicates the process of fixing the film to the mounting. When the mountings are processed mechanically it is important that the transparency be firmly positioned on one of the mount halves before the other half is placed thereon. With just one point of adhesive, the firmness required for positioning is difficult to achieve.

The problem facing the inventor was therefore to provide a mounting which permits flat positioning of the film strip to be made on the mounting half which first receives the film strip and which at the same time permits sufficient capacity for the film to expand under the influence of heat. For as known, the intensive heat effect formed by projection as a result of heat rays is such that, with insufficient latitude within the mount for expansion, a wave-like warping of the transparency occurs. This results in a reduction of sharpness of the projected image and continuous readjustment of the focus is required. The problem is particularly acute when the transparency image is to be viewed for a substantial period of time.

The solution which the inventor has provided to the foregoing problem is that at least one of the mount halves have applied thereto on the opposite sides of the image window or opening an adhesive point for receiving and holding the transparency in place on the mount half, the adhesive points having such a thickness and elasticity that the transparency, although properly affixed thereto, is movable within such limits sufficient to prevent the wave-like warping which occurs under the influence of heat. The adhesive points are preferably of a self-sticking type so that the transparency only has to be pressed at adhesive points in order to affix same to the mounting half.

Other objects, adaptabilities and capabilities will appear as the description progresses, reference being had to the accompanying drawings, in which:

BRIEF DESCRIPTION OF THE DRAWINGS

FIG. 1 is a plan view of the mount half for first receiving a film strip;

FIG. 2 is a plan view of the other mount half;

FIG. 3 is an enlarged sectional view of the upper mount half taken on section lines III—III of FIG. 2; and FIG. 4 is an enlarged sectional view of the mount halves connected together taken on lines IV—IV of FIGS. 1 and 2.

DESCRIPTION OF THE PREFERRED EMBODIMENTS

Referring to the Figures, the mounting comprises two mount halves 10 and 11 which are adapted to have one placed on top of the other. Preferably the lower mount half 10 is a different color — say grey, than the upper mount half 11 which may be a white. Both mount halves 10 and 11 are composed of plastic which is deformable within limits and are connectable with each other with a squeeze-effect. Also they can be easily separated. Thus each mount half 10 and 11 is provided with a plurality of strip-like elevations or tongues 12 and channel-like recesses or grooves 14 as well as protrusions 15 and indentations 16 which are adapted to grip each other in a tongue and groove fashion. These tongues, grooves, protrusions and indentations are placed, as shown in the Figures, so that the mount halves 10 and 11 may be placed together in any position wherein the image window 17 of each mount half is in alignment and closed onto each other with a squeezing effect to be connected as shown in FIG. 4. In addition, the protrusions 15 and indentations 16 are so placed as to serve as means for positioning the transparency 18, shown in dot-dash lines in FIGS. 1 and 4, in place against unintended lateral displacement.

It will be appreciated that in each mount half 10 and 11, the rectangular image window 17 is surrounded by a rectangular and stamped out recess portion 20. Portions 20 are spaced apart when the mount halves 10 and 11 have been joined by connection of the tongues 12, grooves 14, protrusions 15 and indentations 16. The image window 17 forms the outer limits for the view afforded by the transparency when placed in position. The space 22 (FIG. 4) provided for the transparency 18 between the recess portions 20 is slightly larger than required by the thickness of transparency 18. In the recess portion 20 of the mount half 10, which initially receives transparency 18, a pair of adhesive points 21 are placed on opposite sides of image window 17. The adhesive points 21 have a minimal thickness and sufficient elasticity so that the transparency 18 applied thereto remains movable, within certain limits. Contrary to most adhesive mediums, adhesive points 21 do not harden completely. An adhesive which has been found satisfactory in the desired thickness which it can be applied and the fact that it does not completely harden is copolymer acryl-ester known also as copolymers acrylate.

It will be appreciated that elements and groups of elements which are conventional and generally widely known in the field to which the invention pertains have not been described in detail inasmuch as their exact nature or type is not necessary for an understanding and use of the invention by a person skilled in the art. Further, although the preferred embodiment of the invention has been described, it is to be understood that it is capable of other adaptations and modifications.

Having thus described my invention what I claim as new and desire to secure by Letters Patent of the United States is:

1. A mount for slide transparencies which comprises: a first mount half which includes a first image window, a first recess portion surrounding said first image window, and at least one adhesive point applied on each side of said first image window for affixing the transparency thereto; a second mount half connectable to said first mount half which includes a second image window corresponding to said first image window, a second recess surrounding said second image window corresponding to said first recess portion, said first and second recesses providing a space between said first and second mount halves when they are connected together which exceeds the thickness of the film transparency received therein; connection means on each of said mounting halves for connecting said mounting halves whereby said image windows and said recess portions are in juxtaposition; said adhesive points having a thickness and a permanent elasticity whereby the transparency affixed in the mount remains at all times movable within certain predetermined limits.

2. A mount in accordance with claim 1 wherein said adhesive points are composed of a self-sticking material.

3. A mount in accordance with claim 2 wherein said adhesive points are comprised of a copolymer acrylester.

4. A mounting in accordance with claim 1 wherein said connection means comprises tongue and groove connections.

* * * * *